United States Patent
Lin et al.

(10) Patent No.: US 8,283,841 B2
(45) Date of Patent: Oct. 9, 2012

(54) MOTOR END CAP WITH INTERFERENCE FIT

(75) Inventors: Ted T. Lin, Saratoga, CA (US); Ryan C. Lin, Cupertino, CA (US)

(73) Assignee: Lin Engineering, Morgan Hill, CA (US)

( * ) Notice: Subject to any disclaimer, the term of this patent is extended or adjusted under 35 U.S.C. 154(b) by 176 days.

(21) Appl. No.: 12/821,862

(22) Filed: Jun. 23, 2010

(65) Prior Publication Data

US 2011/0316364 A1    Dec. 29, 2011

(51) Int. Cl.
*H02K 7/08* (2006.01)
*H02K 5/00* (2006.01)

(52) U.S. Cl. .......................... 310/407; 310/90

(58) Field of Classification Search .................... 310/89, 310/90, 402, 406–409, 40 MM
See application file for complete search history.

(56) References Cited

U.S. PATENT DOCUMENTS

| | | | | |
|---|---|---|---|---|
| 3,161,794 A | * | 12/1964 | Lindgren | 310/89 |
| 3,612,728 A | | 10/1971 | Fulmer | |
| 3,624,432 A | * | 11/1971 | Merz | 310/53 |
| 3,873,861 A | * | 3/1975 | Halm | 310/43 |
| 3,979,822 A | * | 9/1976 | Halm | 29/596 |
| 4,243,899 A | | 1/1981 | Jaffe | |
| 4,505,031 A | | 3/1985 | Colwell et al. | |
| 4,590,668 A | | 5/1986 | Peachee, Jr. | |
| 4,682,066 A | | 7/1987 | Abbratozzato et al. | |
| 4,715,732 A | | 12/1987 | Sanders | |
| 4,752,708 A | | 6/1988 | Jager et al. | |
| 4,768,888 A | | 9/1988 | McNaull | |
| 4,801,833 A | | 1/1989 | Dye | |
| 4,857,789 A | | 8/1989 | Suimon | |
| 4,992,686 A | | 2/1991 | Heine et al. | |
| 5,008,572 A | * | 4/1991 | Marshall et al. | 310/45 |
| 5,073,735 A | * | 12/1991 | Takagi | 310/71 |
| 5,075,585 A | * | 12/1991 | Teruyama et al. | 310/89 |
| 5,117,138 A | | 5/1992 | Trian | |
| 5,218,256 A | * | 6/1993 | Umezawa et al. | 310/90 |
| 5,219,277 A | | 6/1993 | Tuckey | |
| 5,220,224 A | | 6/1993 | Bosman et al. | |
| 5,291,649 A | | 3/1994 | Lombardi et al. | |
| 5,399,966 A | | 3/1995 | Hartman et al. | |
| 5,567,998 A | | 10/1996 | Ineson et al. | |
| 5,731,646 A | | 3/1998 | Heinze et al. | |
| 5,806,169 A | | 9/1998 | Trago et al. | |
| 5,845,390 A | | 12/1998 | Cheng et al. | |

(Continued)

OTHER PUBLICATIONS

U.S. Appl. No. 12/541,723 (incl. drawings), "Motor End Cap Positioning Element for Maintaining Rotor-Stator Concentricity", filed Aug. 14, 2009, Assignee: Lin Engineering, Inventors: Ted T. Lin and Richard L. Badgerow.

*Primary Examiner* — Quyen Leung
*Assistant Examiner* — Thomas Truong
(74) *Attorney, Agent, or Firm* — Schneck & Schneck; Thomas Schneck; Mark Protsik

(57) ABSTRACT

A rotary machine (e.g., motor or generator) has end caps with plastic piloting rings that engage a stator's plastic winding frame in an interference fit, so that a rotor seated by bearings in the end caps is properly aligned with the stator. The flexibility of the plastic-to-plastic fit allows looser tolerances in comparison to machining of all-metal end caps, while the average circle of the piloting ring's outer diameter still assures proper concentricity of rotor shaft, bearings, piloting rings and stator.

16 Claims, 5 Drawing Sheets

U.S. PATENT DOCUMENTS

| | | |
|---|---|---|
| 6,020,661 A | 2/2000 | Trago et al. |
| 6,161,274 A | 12/2000 | Stark et al. |
| 6,249,066 B1 * | 6/2001 | Ikegami et al. ............ 310/49.23 |
| 6,538,355 B1 | 3/2003 | Horng et al. |
| 6,629,356 B2 | 10/2003 | Wang et al. |
| 6,661,140 B2 | 12/2003 | Agnes et al. |
| 6,672,402 B2 | 1/2004 | Ortt et al. |
| 6,753,636 B2 | 6/2004 | Rehm et al. |
| 6,772,502 B2 | 8/2004 | Scott |
| 6,842,966 B1 | 1/2005 | Campbell et al. |
| 7,131,182 B2 | 11/2006 | Yeh et al. |
| 7,675,211 B2 | 3/2010 | Dimascio et al. |
| 8,063,547 B2 * | 11/2011 | Makino et al. ................ 310/400 |
| 2003/0020343 A1 | 1/2003 | Whelan et al. |
| 2004/0056383 A1 | 3/2004 | Worden et al. |
| 2007/0182261 A1 * | 8/2007 | Rapp et al. ...................... 310/90 |
| 2008/0042503 A1 * | 2/2008 | Hartkorn et al. ................ 310/90 |
| 2008/0253915 A1 | 10/2008 | Moore |
| 2008/0272665 A1 | 11/2008 | Tse |
| 2009/0108686 A1 | 4/2009 | Jeung |
| 2009/0134726 A1 | 5/2009 | Hoyt |
| 2011/0037352 A1 * | 2/2011 | Lin et al. ...................... 310/402 |

* cited by examiner (e)

(f)

(g)

(h)

MOTOR END CAP WITH INTERFERENCE FIT

TECHNICAL FIELD

The present invention relates to arrangements for handling mechanical energy structurally associated with a machine (such as in driving a motor), including details of casings, enclosures or supports (such as mounting arrangements for bearings and end plates), with particular focus on assembling a machine with proper alignment (such as centering a rotor within a stator, and/or balancing such a rotor).

BACKGROUND ART

In the manufacture and assembly of rotary dynamoelectric machines, such as electric motors or generators, establishing and maintaining a concentric relationship between the rotor and stator is essential for the smooth and efficient operation of such machines. End caps of a casing, also sometimes referred to as end plates or bearing shields, seat a rotor assembly (rotor, drive shaft and bearings). Piloting of end caps to a stator's inner diameter has proved to be the best approach to establishing proper centering and axial alignment of the rotor within the stator. However, traditional end cap designs have required precision machining to very tight tolerances.

FIGS. 1a-1h illustrate this precision machining for a typical motor end cap. FIGS. 1a and 1b show different assembled motors, one with a square perimeter end cap with screw holes in the corners, and the other with a circular perimeter end cap that is form fitted to the rest of the motor casing. Thus, the exterior portion of an end cap does not normally require the precision machining that is demanded of certain interior portions of the end cap, namely of the piloting ring 11 seen in FIG. 1d that engages with the stator assembly. The traditional end cap is made of a metal such as aluminum. This metal end cap has a central opening 13 through which passes a drive shaft for the rotor assembly. The piloting ring 11 has an inner diameter 15 that closely matches a bearing outer diameter so that the bearing will just fit within the piloting ring 11. The piloting ring 11 also has an outer diameter 17 that closely matches an inner diameter of a stator's plastic (insulating) winding frame for a tight fit. The winding frame's insulator plastic inner diameter is honed in-line with the stator inner diameter. Typical dimensions are 6 mm diameter for the central opening, 16 mm diameter for the piloting ring inner diameter, and 22 mm diameter for the piloting ring outer diameter. The tolerances are very tight for the piloting ring diameters and their concentricity with each other, generally to within 10 µm and preferably 5 µm).

Because of the cost incurred in the precision machining of the end caps, an end cap wherein the tolerances can be relieved without adversely affecting motor quality and performance would be beneficial.

SUMMARY DISCLOSURE

A rotary machine, such as an electric motor or generator, has plastic piloting rings of respective first and second end caps engaging in a plastic-to-plastic interference fit with a plastic winding frame of a stator, such that a rotor, seated between the end caps by bearings, is centered and aligned within the stator. Unlike a machined metal piloting ring, the tolerances of the piloting diameter can be relaxed somewhat, because the flexibility of the plastic allows the piloting ring to interference fit with the plastic winding frame, using the average circle of each to obtain good concentricity to the center of the end cap.

The rotor machine comprises a stator within a casing, first and second end caps, and a rotor located within the stator between the end caps. The stator includes a plastic winding frame with an inner diameter that is honed at each end to be in-line with a stator inner diameter such that the frame inner diameter can serve to pilot the positioning of the rotor within the stator. Each end cap has a plastic piloting ring with an inner diameter seating a bearing and an outer diameter that engages the inner diameter of the plastic winding frame at one of the two ends. The inner and outer diameters of each piloting ring are concentric. The rotor has an axial shaft seated by the bearings in the two end caps. The plastic-to-plastic interference fit of the piloting ring to the frame ensures that the bearings in the respective end caps are concentric with the stator inner diameter, and thus ensures that the rotor seated by the bearings is centered and aligned with the stator. The outer diameter of each piloting ring may have a tolerance relaxed to as much as ±50 µm and a run-out relative to the ring's inner diameter as much as ±75 µm. This is five to ten times larger than prior tolerances for machined metal piloting rings, reducing the cost of manufacture.

Assembling the rotary machine involves providing a stator within a casing that has the aforementioned plastic winding frame, attaching a first end cap with bearing, using the cap's plastic piloting ring to engage in a plastic-to-plastic interference fit with the winding frame of the stator, inserting a rotor into the stator so that the axial shaft of the rotor is seated by the bearing in the first end cap, and finally attaching the second end cap so that the piloting ring engages in a plastic-to-plastic interference fit with he other end of the winding frame and its bearing seats the axial shaft of the rotor in proper centering and alignment relation with the stator.

BRIEF DESCRIPTION OF THE DRAWINGS

FIGS. 1a and 1b show complete assembled motors, while the remaining views focus solely on the end cap itself. FIG. 1b provides an alternative end cap construction conforming to the motor casing, while the remaining figures have an otherwise similar, square-shaped end cap construction adapted for receiving mounting screws. FIGS. 1c and 1d are perspective outside and inside views of one end cap for the motor in FIG. 1a. FIGS. 1e and 1f are plan views of the respective outside and inside of the end cap seen in FIGS. 1c and 1d. FIG. 1g is a sectional view indicated by the cut line A-A in FIG. 1e, while FIG. 1h is an enlarged view of the area indicated by B in FIG. 1g.

DETAILED DESCRIPTION

Figure 1:
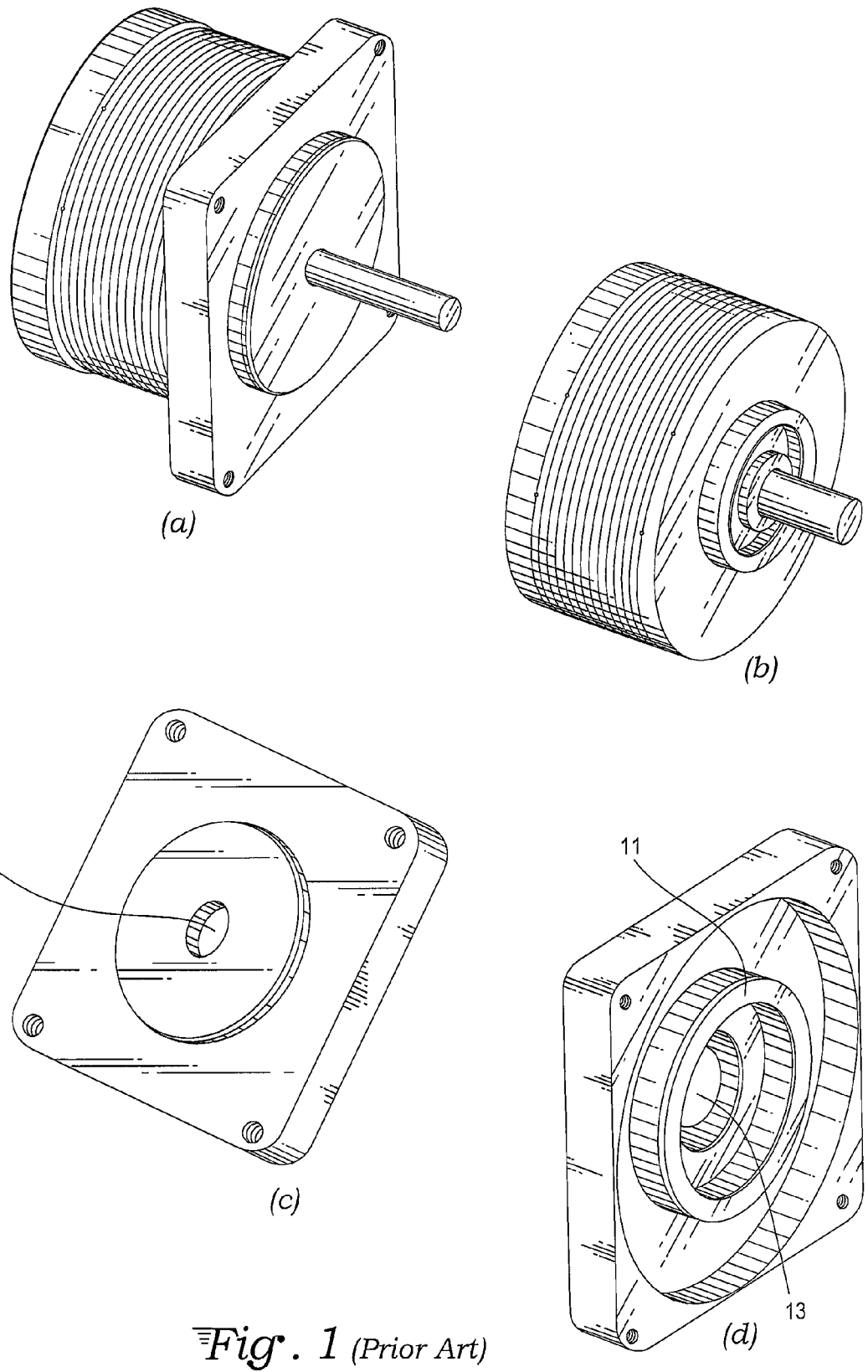
FIGS. 1a-1h show various views of a prior art motor with metal end cap.
Figure 1:
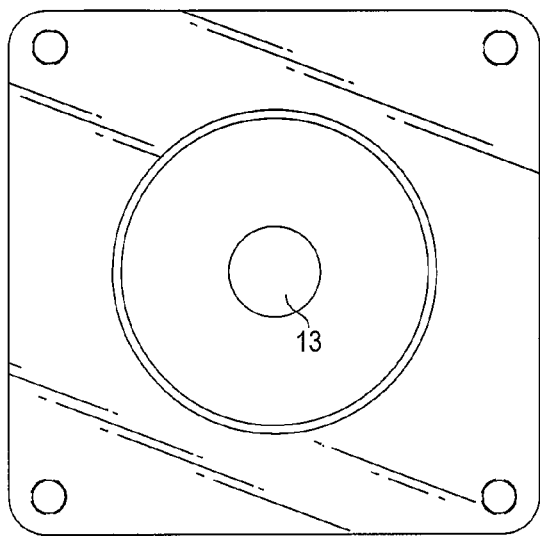
Figure 1:
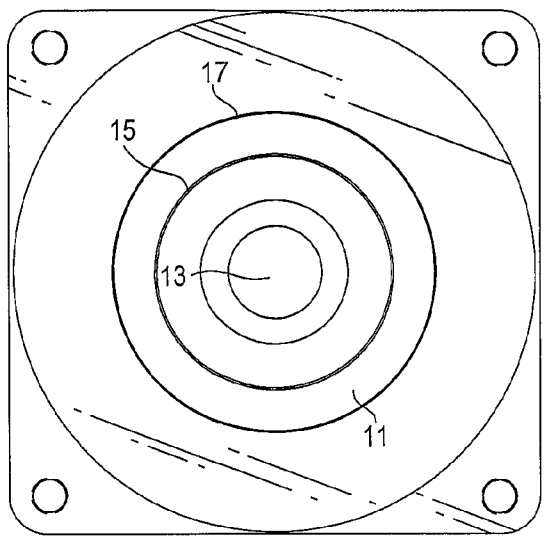
Figure 1:
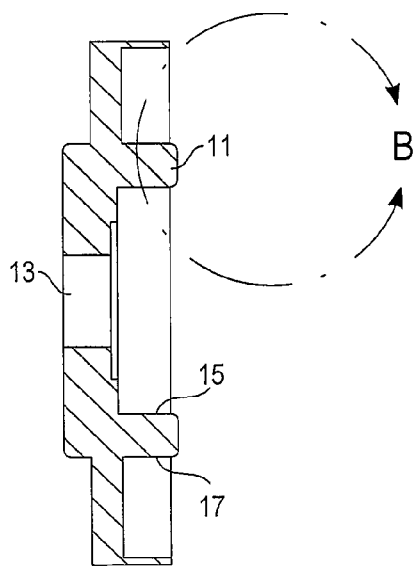
Figure 1:
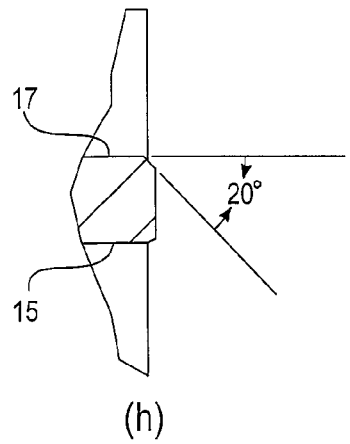
Figure 2A:
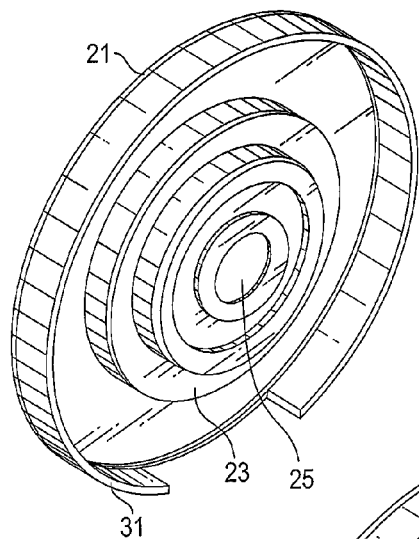
FIGS. 2a and 2b are respective perspective and sectional views of an end cap in accord with the present invention having a plastic piloting ring, shown here with bearing attached.
Figure 2B:
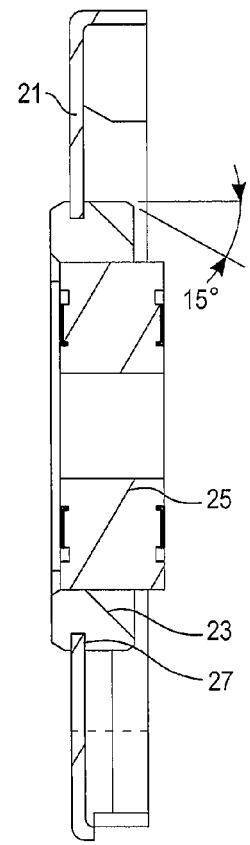
Figure 3A:
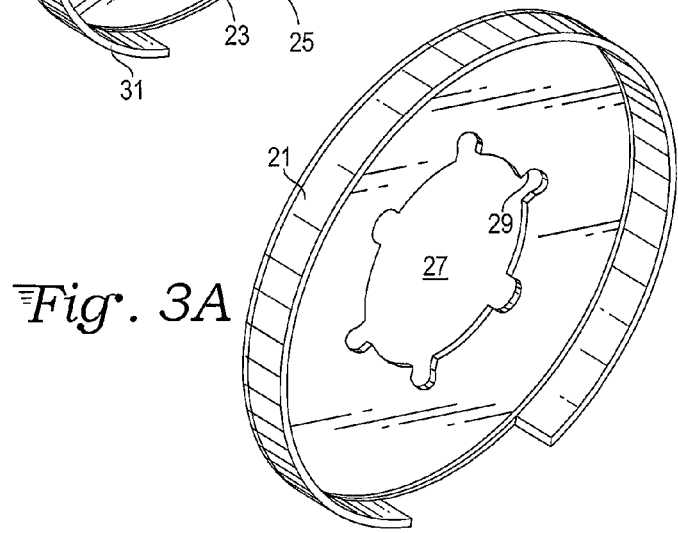
FIGS. 3a-3c are respective perspective, plan and sectional views of the end cap in FIGS. 2a and 2b but with piloting ring or bearing removed. The end cap embodiment in FIGS. 2a-2b and 3a-3c have circular perimeter adapted to conform to a motor casing, and especially suitable as a motor's rear end cap.
Figure 3B:
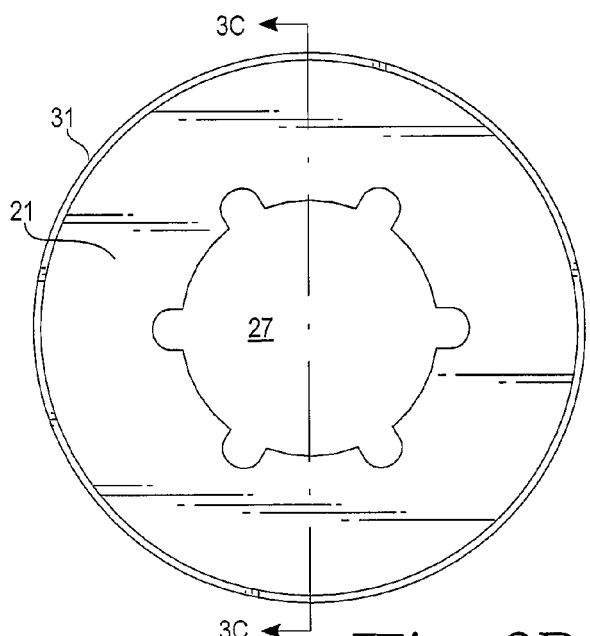
Figure 3C:
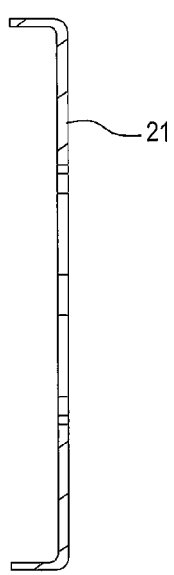

With reference to FIGS. 2a and 2b, an end cap 21 in accord with the present invention has a plastic piloting ring 23. A bearing 25 is attached within the inner diameter of the piloting ring 23. In FIGS. 3a and 3b, the end cap 21 has the piloting ring and bearing removed so that certain features of the metal end cap 21 that allow the plastic piloting ring 23 to be conveniently attached, namely the inner opening 27 with detents 29, are visible. The end cap 21 may be formed of stamped steel. The outer perimeter 31 of the end cap 21 may conform generally to a cylindrical stator casing, as in the circular shape of this embodiment, with a typical diameter of about 36 mm, which may be slightly larger than the stator casing so as to fit loosely over the end of the casing to a typical depth of about 3.8 mm so as to allow laser welding of the end cap to that casing. However, it is important that the fit over the stator casing not be too snug, as this could distort the piloting accomplished by the plastic ring 23.

The piloting ring 23 has an outer diameter that matches the inner diameter of the stator's winding frame so as to fit within that frame. A typical dimension for the outer diameter is 22 mm, with a tolerance of as much as ±50 μm. This is 5 to 10 times larger than that for the prior machined metal end caps. The outer diameter of the ring 23 may have a 15° inward bevel to aid insertion into the frame. The piloting ring 23 is molded in place in the smaller diameter opening 27 of the metal end cap 21. For example, the opening 27 might have a diameter of about 16 to 18 mm, leaving a 2 to 3 mm deep circumferential notch 27 around the outer diameter of the piloting ring 23, which holds it firmly in place to the end cap 21. Typically, a 4 mm thick piloting ring 23 extends forward of the end cap by about 1 mm, leaving the remaining 3 mm for piloting into the end of the stator's winding frame.

The piloting ring 23 also has an inner diameter, typically about 16 mm, that matches an outer diameter of the bearing 25 in order to seat the bearing 25. The bearing 25, in turn, has an inner diameter, typically about 5 mm, that matches that of the rotor shaft. The inner and outer diameters of the piloting ring 23 are formed so as to be concentric with one another. The run-out of the outer diameter relative to the corresponding inner diameter of the same piloting ring (and hence also to the bearing outer diameter) may be as much as ±75 μm. Likewise, the inner and outer diameters of the bearing 25 are concentric. Indeed, the bearing 25 is preferably molded together with the plastic piloting ring for consistent shrinkage of the plastic and better concentricity. Thus, when the outer diameter of the piloting ring 23 fits into the stator's winding frame, the rotor shaft will be concentric with the stator to close tolerances. The flexibility of the plastic-to-plastic interference fit allows one to the average circles of the piloting ring outer diameter and stator winding frame inner diameter to align the parts in concentric relation.

Figure 4A:
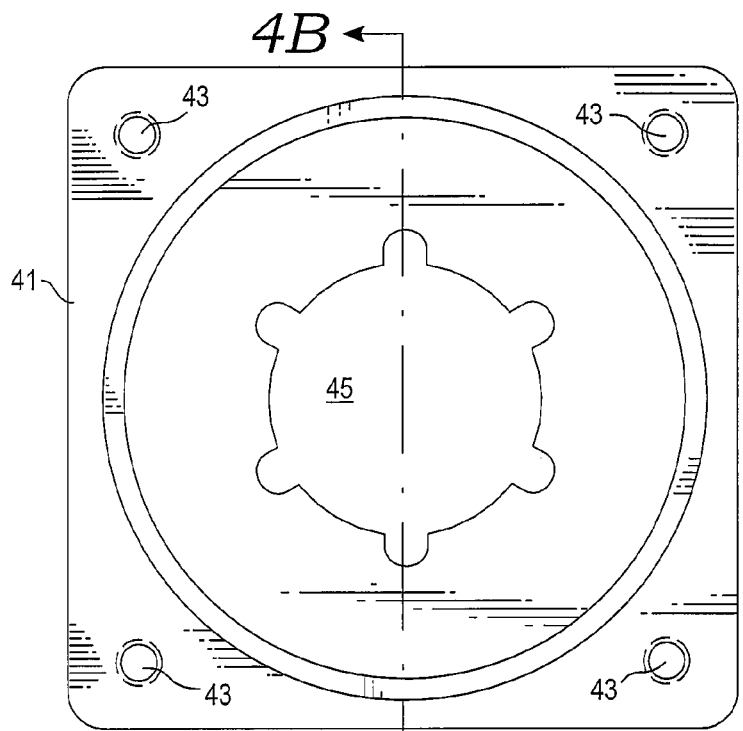
FIGS. 4a-4c are respective plan, sectional and enlarged views of an end cap embodiment adapted to receive mounting screws, and especially suitable as a motor's front end cap.
Figure 4B:
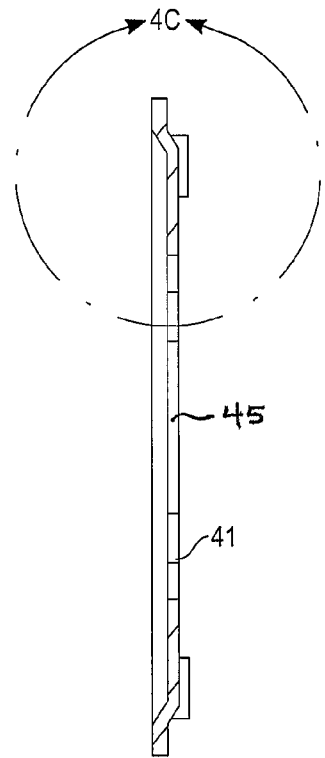
Figure 5:
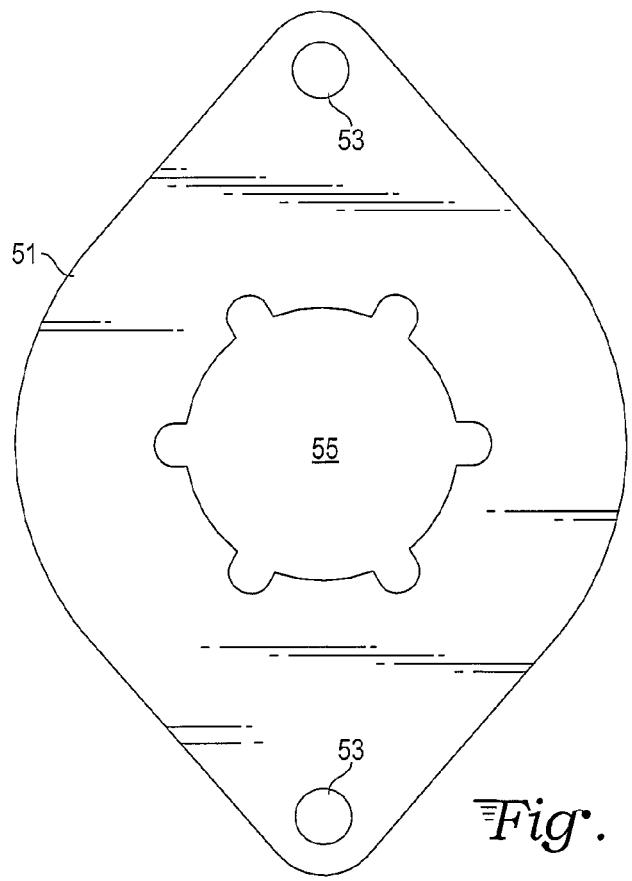
FIG. 5 is a plan view of an alternative end cap that receives only two mounting screws, compared to the four mounting screws for the embodiment of FIGS. 4a-4c.
Figure 4C:
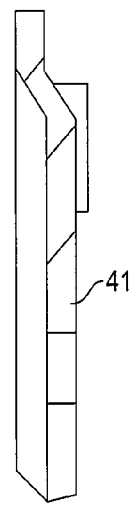

With reference to FIGS. 4a-4c, an alternative embodiment of an end cap 41, especially suited to a front mounting end of the motor, may have a square shape that is constructed to extend outward beyond a stator casing in order to receive mounting screws, as in the four screw holes 43 at the respective corners of the end cap 41. Another version of an end cap 51, seen in FIG. 5, has an ovate or elliptic leaf-like shape with only two screw holes 53 that are located near the elongated ends of the cap. In each of these versions, a central opening 45 or 55 corresponding to the opening 27 of end cap 21, wherein a piloting ring essentially identical to piloting ring may be molded. Thus, the only difference is the shape of the perimeter.

Figure 6:
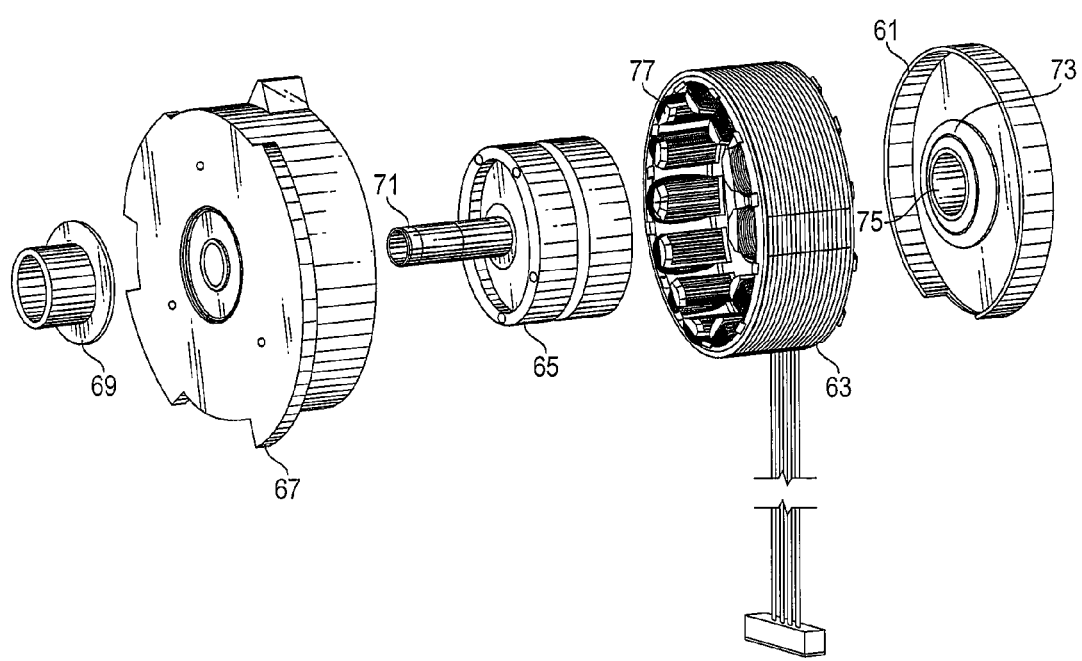
FIG. 6 is an exploded view of a motor having end caps in accord with the present invention.

With reference to FIG. 6, a rotary machine, such as a motor or generator, has a first (rear) end cap 61, a stator 63, a rotor 65, and a second (front) end cap 67. The "front" end is normally designated the side on which the machine is mounted. In this embodiment, a pulley 69 may be optionally affixed to the rotor shaft 71 outside of the end cap 67. The rear end cap 61 is seen to have a plastic piloting ring 73 seating a bearing 75. The front end cap 67 is similarly provisioned. Here the end cap 67 is seen in alternative embodiment in which the cap itself, piloting ring and casing for the stator 63 are a single piece of molded plastic. One end of the stator's plastic winding frame 77 is visible in the view. To assemble the rotary machine, the rear end cap 61 with bearing 75 is attached to the stator 63, using the cap's plastic piloting ring 73 to engage in a plastic-to-plastic interference fit with the winding frame 77 of the stator 63. This centers the bearing 75 relative to the stator 63. The rotor 65 is inserted into the stator so that the bearing 75 in the rear end cap 61 seats the portion of the axial shaft 71 that extends from the back side of the rotor 65. The end cap 67 is attached to the stator 63, using its piloting ring to engage in a plastic-to-plastic interference fit with the front end of the winding frame 77. This centers the bearing in the end cap 67, which seats the axial shaft 71 of the rotor 65 in proper alignment with the stator 63. The end caps may be held in place by applying an adhesive. Alternatively, where metal end caps with plastic piloting rings like those in FIGS. 2-5 are used, the metal may be laser welded to the stator casing.

What is claimed is:

1. A rotary machine, comprising:
   a stator including a plastic winding frame with an inner diameter that is honed at each end to be in-line with a stator inner diameter, such that the frame inner diameter can serve to pilot the positioning of a rotor within the stator; and
   a first end cap having a plastic piloting ring with an inner diameter seating a first bearing and with an outer diameter concentric with the inner diameter, the outer diameter of the piloting ring engaging the inner diameter of the plastic winding frame at a first end in a plastic-to-plastic interference fit such that the first bearing is concentric with the stator inner diameter;
   a second end cap having a plastic second piloting ring with an inner diameter of the second end cap seating a second bearing and with an outer diameter of the second end cap concentric with the inner diameter of the second end cap, the outer diameter of the second piloting ring engaging the inner diameter of the plastic winding frame at a second end in a plastic-to-plastic interference fit such that the second bearing is concentric with the stator inner diameter; and
   the rotor located within the stator between the first and second end caps, the rotor having an axial shaft seated by the first and second bearings concentric with the stator inner diameter such that the rotor is centered and aligned with the stator by the first and second end caps.

2. A rotary machine as in claim 1, wherein at least one of the end caps is a metal plate with a central opening into which the plastic piloting ring has been molded in place.

3. A rotary machine as in claim 1, wherein at least one of the end caps with piloting ring is a single piece of molded plastic.

4. A rotary machine as in claim 1, wherein the first and second bearings are molded with the plastic piloting rings of the respective first and second end caps.

5. A rotary machine as in claim 1, wherein each end cap is laser welded in place to a stator casing.

6. A rotary machine as in claim 1, wherein at least one end cap is held in place with an adhesive composition.

7. A rotary machine, comprising:
a stator including a plastic winding frame with an inner diameter that is honed at each end to be in-line with a stator inner diameter, such that the frame inner diameter can serve to pilot the positioning of a rotor within the stator; and
a first end cap having a plastic piloting ring with an inner diameter seating a first bearing and with an outer diameter concentric with the inner diameter, the outer diameter of the piloting ring engaging the inner diameter of the plastic winding frame at a first end in a plastic-to-plastic interference fit such that the first bearing is concentric with the stator inner diameter;
a second end cap having a plastic second piloting ring with an inner diameter of the second end cap seating a second bearing and with an outer diameter of the second end cap concentric with the inner diameter of the second end cap, the outer diameter of the second piloting ring engaging the inner diameter of the plastic winding frame at a second end in a plastic-to-plastic interference fit such that the second bearing is concentric with the stator inner diameter; and
the rotor located within the stator between the first and second end caps, the rotor having an axial shaft seated by the first and second bearings concentric with the stator inner diameter such that the rotor is centered and aligned with the stator by the first and second end caps;
wherein the outer diameter of each piloting ring has a tolerance held at ±50 μm with an average circle matching that of honed ends of the plastic winding frame of the stator.

8. A rotary machine, comprising:
a stator including a plastic winding frame with an inner diameter that is honed at each end to be in-line with a stator inner diameter, such that the frame inner diameter can serve to pilot the positioning of a rotor within the stator; and
a first end cap having a elastic piloting ring with an inner diameter seating a first bearing and with an outer diameter concentric with the inner diameter, the outer diameter of the piloting ring engaging the inner diameter of the plastic winding frame at a first end in a plastic-to-plastic interference fit such that the first bearing is concentric with the stator inner diameter;
a second end cap having a plastic second piloting ring with an inner diameter of the second end cap seating a second bearing and with an outer diameter of the second end cap concentric with the inner diameter of the second end cap, the outer diameter of the second piloting ring engaging the inner diameter of the plastic winding frame at a second end in a plastic-to-plastic interference fit such that the second bearing is concentric with the stator inner diameter; and
the rotor located within the stator between the first and second end caps, the rotor having an axial shaft seated by the first and second bearings concentric with the stator inner diameter such that the rotor is centered and aligned with the stator by the first and second end caps;
wherein the outer diameter of each piloting ring has a run-out held at ±75 μm relative to the corresponding inner diameter of the same piloting ring.

9. A method of assembling a rotary machine, comprising:
providing a stator including a plastic winding frame with an inner diameter that is honed at each end to be in-line with a stator inner diameter;
attaching a first end cap to the stator, the first end cap including a plastic second piloting ring with concentric inner and outer diameters, the inner diameter of the second piloting ring seating a first bearing and the outer diameter of the second piloting ring engaging the inner diameter of the plastic winding frame at a first end in a plastic-to-plastic interference fit such that the first bearing is concentric with the stator inner diameter;
inserting a rotor into the stator with an axial shaft of the rotor seated in the first bearing; and
attaching a second end cap to the stator, the second end cap including a plastic piloting ring with concentric inner and outer diameters, the inner diameter of the piloting ring seating a second bearing and the outer diameter of the piloting ring engaging the inner diameter of the plastic winding frame at a second end in a plastic-to-plastic interference fit such that the second bearing is concentric with the stator inner diameter, the second bearing seating the axial shaft of the rotor such that the axial shaft is concentric with the stator inner diameter and the rotor is thereby centered and aligned within the stator.

10. A method as in claim 9, wherein at least one of the end caps is formed by molding a plastic piloting ring within a central opening of a metal plate.

11. A method as in claim 9, wherein at least one of the end caps is formed with its piloting ring as a single piece of molded plastic.

12. A method as in claim 9, wherein the first and second bearings are molded with the plastic piloting rings of the respective first and second end caps.

13. A method as in claim 9, further defined by laser welding each end cap in place to a stator casing.

14. A method as in claim 9, further defined by adhering at least one end cap in place.

15. A method of assembling a rotary machine, comprising:
providing a stator including a plastic winding frame with an inner diameter that is honed at each end to be in-line with a stator inner diameter;
attaching a first end cap to the stator, the first end cap including a plastic second piloting ring with concentric inner and outer diameters, the inner diameter of the second piloting ring seating a first bearing and the outer diameter of the second piloting ring engaging the inner diameter of the plastic winding frame at a first end in a plastic-to-plastic interference fit such that the first bearing is concentric with the stator inner diameter;
inserting a rotor into the stator with an axial shaft of the rotor seated in the first bearing; and
attaching a second end cap to the stator, the second end cap including a plastic second piloting ring with concentric inner and outer diameters, the inner diameter of the second piloting ring seating a second bearing and the outer diameter of the second piloting ring engaging the inner diameter of the plastic winding frame at a second end in a plastic-to-plastic interference fit such that the second bearing is concentric with the stator inner diameter, the second bearing seating the axial shaft of the rotor such that the axial shaft is concentric with the stator inner diameter and the rotor is thereby centered and aligned within the stator;

wherein the outer diameter of each piloting ring is formed to a tolerance held at ±50 μm with an average circle matching that of honed ends of the plastic winding frame of the stator.

16. A method of assembling a rotary machine, comprising:

providing a stator including a plastic winding frame with an inner diameter that is honed at each end to be in-line with a stator inner diameter;

attaching a first end cap to the stator, the first end cap including a plastic second piloting ring with concentric inner and outer diameters, the inner diameter of the second piloting ring seating a first bearing and the outer diameter of the second piloting ring engaging the inner diameter of the plastic winding frame at a first end in a plastic-to-plastic interference fit such that the first bearing is concentric with the stator inner diameter;

inserting a rotor into the stator with an axial shaft of the rotor seated in the first bearing; and attaching a second end cap to the stator, the second end cap including a plastic second piloting ring with concentric inner and outer diameters, the inner diameter of the second piloting ring seating a second bearing and the outer diameter of the second piloting ring engaging the inner diameter of the plastic winding frame at a second end in a plastic-to-plastic interference fit such that the second bearing is concentric with the stator inner diameter, the second bearing seating the axial shaft of the rotor such that the axial shaft is concentric with the stator inner diameter and the rotor is thereby centered and aligned within the stator;

wherein the outer diameter of each piloting ring is formed with a run-out held at ±75 μm relative to the corresponding inner diameter of the same piloting ring.

* * * * *